Patented Aug. 10, 1943

2,326,725

UNITED STATES PATENT OFFICE 2,326,725

CURING CATALYST FOR ACID-CURING THERMOSETTING RESINS

David W. Jayne, Jr., Old Greenwich, and Paul C. Schroy, Stamford, Conn., assignors to American Cyanamid Company, New York, N. Y., a corporation of Maine No Drawing. Application July 4, 1939, Serial No. 282,820

13 Claims. (Cl. 260—71)

This invention relates to substantially stable compositions containing acid-curing thermosetting resins and is especially directed to such compositions which include suitable curing catalysts.

Most of the catalysts which have been previously proposed for use with acid-curing thermosetting resins cause such resins to lose plasticity at relatively low temperatures. If compositions containing such catalysts, together with an uncured acid-curing thermosetting resin be stored, the resin may partially or wholly cure even at normal temperatures. This results in the case of molding powders in a loss of proper flow characteristics and, therefore, in a loss of utility for most purposes. Furthermore if it be desirable to subject a composition containing the resin and a catalyst to preliminary mild heat without curing as may be necessary in many operations such as textile treating, impregnating, laminating, etc., then it is preferable to use a curing catalyst which is relatively inactive at low temperatures but which will cure the resin readily at somewhat higher temperatures. It may also be desirable to produce molding compositions which have a curing catalyst incorporated therein prior to drying the composition. This is impossible if most of the known catalysts or accelerators be used since they tend to cure the resin at drying temperatures.

One object of this invention is to provide catalysts or accelerators for acid-curing thermosetting resins which will cure such resins rapidly only at relatively high temperatures. Another object of this invention is to provide catalysts which will cure acid-curing thermosetting resins at temperatures at least about 135° C.

Still another object of this invention is to provide catalysts which will not cure compositions containing acid-curing thermosetting resins appreciably at room temperatures or at slightly elevated temperatures.

These and other objects are attained by employing as a catalyst an N-acyl imide or N-acyl derivative of a sulfonamide.

The following examples of the practice of our invention are given by way of illustration and not in limitation.

Example 1

| | Parts by weight |
|---|---|
| Cellulose (sulfite wood pulp) | 35 |
| Urea-formaldehyde resin (dry basis) | 65 |
| Zinc stearate | 0.5 |
| N-benzoyl phthalimide | 0.3–0.5 |

The cellulose is impregnated with an aqueous urea-formaldehyde resin syrup and dried in the usual manner below about 100° C. To the substantially neutral product the zinc stearate (or other mold lubricant) may be added and ground in a ball mill or other suitable apparatus. The benzoyl phthalimide is added during the grinding to form a molding composition which is quite stable at room temperatures or slightly elevated temperatures. The composition may be molded under pressures of 3000–5000 pounds per square inch at about 135°–165° C. in about one half to three minutes for ordinary pieces. The resulting molded article has excellent water resistance. The molding composition produced according to this example will not actually cure appreciably at temperatures under about 135° C., e. g. 130° C., although the composition will set after about three to four minutes at the latter temperature. Curing at such temperatures requires relatively long periods of time and in fact the composition may not cure at all. When a composition of this type is "cured," it is substantially completely polymerized, it has good chemical resistance, e. g. good water resistance and, of course, it has lost its former ability to flow. On the other hand, when a resin is merely "set," it does not have good chemical resistance but has merely lost its former ability to flow and is only partially polymerized.

Example 2

| | Parts by weight |
|---|---|
| Cellulose (sulfite wood pulp) | 35 |
| Urea-formaldehyde resin (dry basis) | 65 |
| Zinc stearate | 0.5 |
| N-benzoyl phthalimide | 0.3–0.5 |

The zinc stearate and benzoyl phthalimide are intimately mixed with the resin (in syrup form) and the resulting mixture, with or without the addition of a base e. g. triethanolamine to adjust the pH, is used to impregnate the cellulose. The impregnated material is dried under suitable conditions, e. g. in a current of air at about 70–75° C. and then ground in any suitable apparatus, e. g. a ball mill. A molding powder is obtained in which the catalyst is incorporated with the resin, thereby avoiding the addition of the catalyst in the final stage of the preparation of the molding composition. The mixture of resin and catalyst is substantially unaltered at temperatures around 70°–75° C. and, therefore, it may be safely incorporated in the resin before drying. The molding composition prepared according to this example has molding properties quite similar to those of compositions prepared according to Example 1 and may be molded similarly.

*Example 3*

Compositions are made similar to Example 2 except that the catalyst is mixed with a small quantity, e. g. 1-2 parts, of a suitable plasticizer. N-ethanol p-toluene sulfonamide is particularly suitable. This mixture of accelerator and plasticizer is then ground with the filler, resin and mold lubricant if any be used. There is preferably included in the composition about 0.1-0.4 part of triethanolamine or other suitable base to increase the stability of the composition and to slow up the rate of setting somewhat. Such compositions may then be extruded at about 115°-135° C., preferably at about 135° C. without setting up appreciably in three to four minutes and even up to seven or more minutes, whereas when put into a hot mold at about 150°-160° C., they will cure rapidly in about one half to two minutes.

Other acid-curing thermosetting resins may be substituted for all or part of the urea-formaldehyde resin employed in Examples 1-3 inclusive. The term "acid-curing thermosetting resin" includes those resins which may be cured only under acid conditions and also those which may be cured under either acid or alkaline conditions. Such resins include those obtained by reacting an aldehyde e. g. formaldehyde, acetaldehyde, benzaldehyde, etc. with one or more of the following: thiourea, the reaction products obtained by heating and decomposing dicyandiamide, melamine, other aminotriazines, phenol, other phenols such as the alkyl phenols, etc. Mixed resins e. g. urea-melamine-formaldehyde resins, urea-thiourea-formaldehyde resins, etc. may be prepared by reacting the aldehyde with each of the other reactants separately or the aldehyde may be reacted with a mixture of other reactants. Mixed resins containing from about 20%-60% of melamine-formaldehyde resin and the remainder urea-formaldehyde resin are especially useful.

Usually only a small proportion of catalyst is necessary to produce rapid cures in molding compositions and from about 0.1-1% of the catalyst is preferred although even considerably greater quantities of catalyst may be used without causing substantial precuring during storage or the like. In some applications up to about 5% of the accelerator may advantageously be used.

Other acyl imides which may be substituted for the N-benzoyl pthalimide which is employed in the examples set forth above include N-benzoyl succinimide, N-phthalyl diphthalimide, N-propionyl phthalimide, the N-benzoyl derivative of saccharine, the N-propionyl derivative of saccharine, etc. Among the sulfonamide derivatives which may be used there are N-benzoyl toluene sulfonamide, N-propionyl toluene sulfonamide, etc. Obviously various mixtures of any of these catalysts may be used. All of these substances are substantially neutral but at the elevated curing temperatures they apparently develop acidic materials which effect the rapid curing of the resins.

The time required to cure compositions including an acid-curing thermosetting resin and a catalyst of the type described herein will vary somewhat with the size of piece being molded, with the particular catalyst used, with the particular resin used and with the temperatures at which the composition is cured. Generally the time required for molding ordinary small objects will be between about one half minute and three minutes at temperatures between about 135°-165° C. and at pressures of about 3000-5000 pounds per square inch. If desirable organic bases may be added to the compositions containing the catalyst and resin in order to improve the stability of the composition somewhat and to slow down the rate of curing. Such bases include triethanolamine, triethylamine, hexamethylene tetramine, etc.

While our catalysts are particularly suitable for use in molding compositions, they may also be used in compatible syrups containing acid-curing thermosetting resins for use in laminating, textile treatment, adhesives, etc.

Various fillers, e. g. wood flour, cotton linters, clay, etc. may be used in place of or in addition to cellulose pulp included in the compositions of Examples 1-3 inclusive. Furthermore, coloring materials may be added if desired. In some applications it may be desirable to add modifying agents such as starches, gums, alginates, casein, etc. Plasticizing agents e. g. toluene sulfonamides, alkyd resins, polyhydric alcohols may be incorporated in the compositions for some applications. A mold lubricant is preferably though not necessarily incorporated in the molding composition. A fused mixture of toluene sulfonamide and one of our accelerators such as N-benzoyl phthalimide in finely ground form may be mixed with resin and filler to form a molding composition. This results in better dispersion of the accelerators and, therefore, such compositions cure more uniformly.

Obviously many modifications and variations in the processes and compositions described above may be made without departing from the spirit and scope of the invention as defined in the appended claims.

We claim:

1. A composition comprising an acid-curing thermosetting resin and a latent curing catalyst selected from the group consisting of N-acyl imides and N-acyl sulfonamides.

2. A composition comprising an acid-curing thermosetting resin and an N-acyl imide as a latent curing catalyst.

3. A composition comprising an acid-curing thermosetting resin and N-benzoyl phthalimide as a latent curing catalyst.

4. A molding composition comprising an acid-curing thermosetting resin, a filler and a latent curing catalyst selected from the group consisting of N-acyl imides and N-acyl sulfonamides.

5. A composition containing a urea-formaldehyde resin and N-benzoyl phthalimide as a latent curing catalyst.

6. A composition containing a melamine-formaldehyde resin and N-benzoyl phthalimide as a latent curing catalyst.

7. A composition containing a urea-melamine formaldehyde resin and a latent curing catalyst selected from the group consisting of N-acyl imides and N-acyl sulfonamides.

8. A process of curing an acid-curing thermosetting resin which comprises adding to such a resin, a latent curing catalyst selected from the group consisting of N-acyl imides and N-acyl sulfonamides and subjecting the admixture to a temperature of at least about 135° C.

9. A process of curing an acid-curing thermosetting resin which comprises admixing with such a resin an N-acyl derivative of an imide as a latent curing catalyst and subjecting the admixture to a temperature at least about 135° C.

10. A process of curing an acid-curing thermosetting resin which comprises admixing with such a resin an N-acyl derivative of a sulfonamide as a latent curing catalyst and subjecting the admixture to a temperature at least about 135° C.

11. A process of curing a urea-formaldehyde resin which comprises admixing with such a resin N-benzoyl phthalimide as a latent curing catalyst and subjecting the admixture to a temperature at least about 135° C.

12. A process of curing a melamine-formaldehyde resin which comprises admixing with such a resin N-benzoyl phthalimide as a latent curing catalyst and subjecting the admixture to a temperature at least about 135° C.

13. A process of curing a urea-melamine formaldehyde resin which comprises admixing with such a resin an N-acyl derivative of an imide as a latent curing catalyst and subjecting the admixture to a temperature at least about 135° C.

DAVID W. JAYNE, Jr.
PAUL C. SCHROY.